(12) United States Patent
Philippi

(10) Patent No.: US 8,803,073 B2
(45) Date of Patent: Aug. 12, 2014

(54) METHOD AND DEVICE FOR CALIBRATING AN IRRADIATION DEVICE

(75) Inventor: Jochen Philippi, Gräfelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 698 days.

(21) Appl. No.: 12/798,319

(22) Filed: Apr. 1, 2010

(65) Prior Publication Data

US 2010/0264302 A1 Oct. 21, 2010

(30) Foreign Application Priority Data

Apr. 6, 2009 (DE) .......................... 10 2009 016 585

(51) Int. Cl.
*G01D 18/00* (2006.01)

(52) U.S. Cl.
USPC .................... 250/252.1; 250/250; 250/251

(58) Field of Classification Search
USPC ........................................................ 250/252.1
See application file for complete search history.

(56) References Cited

U.S. PATENT DOCUMENTS

| | | | |
|---|---|---|---|
| 5,123,734 A | 6/1992 | Spence et al. | |
| 5,133,987 A | 7/1992 | Spence et al. | |
| 5,832,415 A | 11/1998 | Wilkening et al. | |
| 6,483,596 B1 | 11/2002 | Philippi et al. | |
| 2004/0147910 A1 | 7/2004 | Fujieda | |
| 2007/0165683 A1* | 7/2007 | Park | 372/22 |
| 2008/0112999 A1* | 5/2008 | Baluca | 424/426 |
| 2008/0165815 A1* | 7/2008 | Kamijima | 372/34 |

FOREIGN PATENT DOCUMENTS

| | | |
|---|---|---|
| CN | 101821081 | 9/2010 |
| DE | 199 18 613 | 11/2000 |
| DE | 103 35 303 | 2/2004 |
| EP | 0 792 481 | 6/1998 |
| EP | 1 048 441 | 11/2000 |
| JP | 2005-133120 | 5/2005 |
| WO | WO 94/15265 | 7/1994 |
| WO | 2009/026520 | 2/2009 |

OTHER PUBLICATIONS

Chinese Office Action issued Jun. 3, 2013 in corresponding Chinese Patent Application No. 201080002172.2.

* cited by examiner

*Primary Examiner* — Michael G Lee
*Assistant Examiner* — Matthew Mikels
(74) *Attorney, Agent, or Firm* — Edwards Wildman Palmer LLP

(57) ABSTRACT

The present invention relates to a method and a device for calibrating an irradiation device of an apparatus for generatively manufacturing a three-dimensional object. The calibration includes steps of arranging an image converter plate (12) in or in parallel to a working plane of the apparatus, wherein the image converter plate (12) outputs detectable light (13), when the irradiation device irradiates predetermined positions of the image converter plate (12) with energetic radiation; of scanning the image converter plate (12) by the irradiation device; of detecting the detectable light (13) by a light detector (15); of determining coordinates of the irradiation device, when the detected light (13) is detected; of comparing the determined coordinates with predetermined reference coordinates; and of calibrating the irradiation device on the basis of a deviation between the determined coordinates and the reference coordinates.

Figure 1:
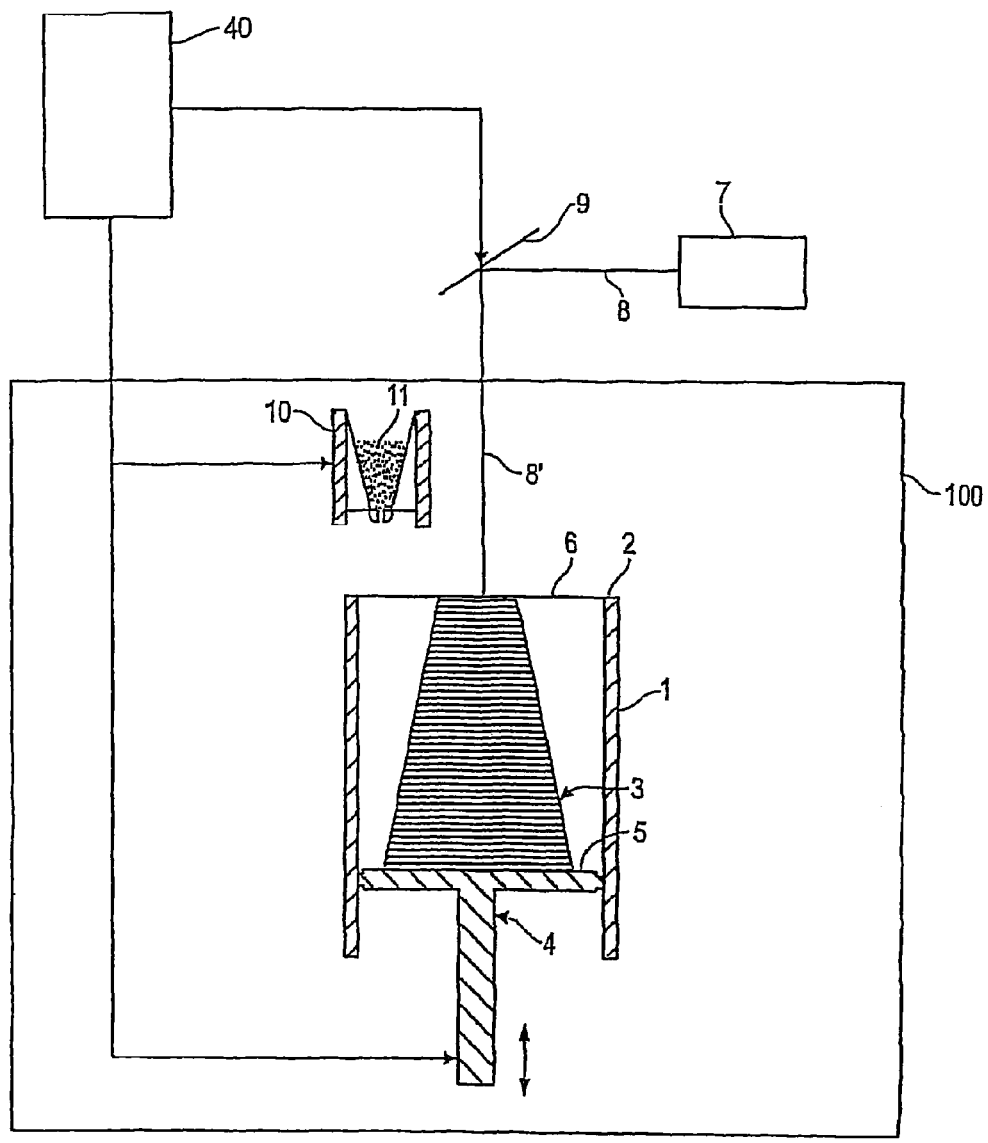

26 Claims, 3 Drawing Sheets ism 4 until the upper side thereof lies below the working# METHOD AND DEVICE FOR CALIBRATING AN IRRADIATION DEVICE The present invention relates to a method and to a device for calibrating an irradiation device of an apparatus for generatively manufacturing a three-dimensional object.

EP-1 048 441 A1 describes a method of calibrating an irradiation device of an apparatus for generatively manufacturing a three-dimensional object, wherein the apparatus layerwise applies a powdery building material onto a support of the apparatus or a previously applied layer, wherein the applied layer defines a working plane, and irradiates the building material by the irradiation device with energetic radiation at locations corresponding to the object to solidify the building material at these locations. The support defines relatively to the machine a coordinate system which is unchangeable relative to the device. During calibration, detectable reference characters are provided on the support, from which the coordinate system relative to the machine is calculated. The energetic radiation is deflected to predetermined target positions within the coordinate system relative to the machine, and a deviation of actual positions of the impact point of the energetic radiation from the target positions is detected by use of the reference characters. The irradiation device is then calibrated according to the deviation. The actual positions of the impact points are herein evaluated by use of a light-sensitive medium such as a thermo-foil and a scanner.

EP-0 792 481 B1 and WO 94/15265 each describe a calibrating method which also use a light-sensitive medium. U.S. Pat. No. 5,123,734 A describes a calibrating method for a stereolithography apparatus, wherein several sensors are used for calibration.

It is the object of the present invention to provide a method and a device for calibrating an irradiation device of an apparatus for generatively manufacturing a three-dimensional object, which can perform the calibration fully automated, cost-efficiently and more accurate.

This object is achieved by the method of calibrating an irradiation device of an apparatus for generatively manufacturing a three-dimensional object having the features of claim 1 and by a corresponding device having the features of claim 10. Advantageous further developments are defined in the sub-claims.

Figure 2:
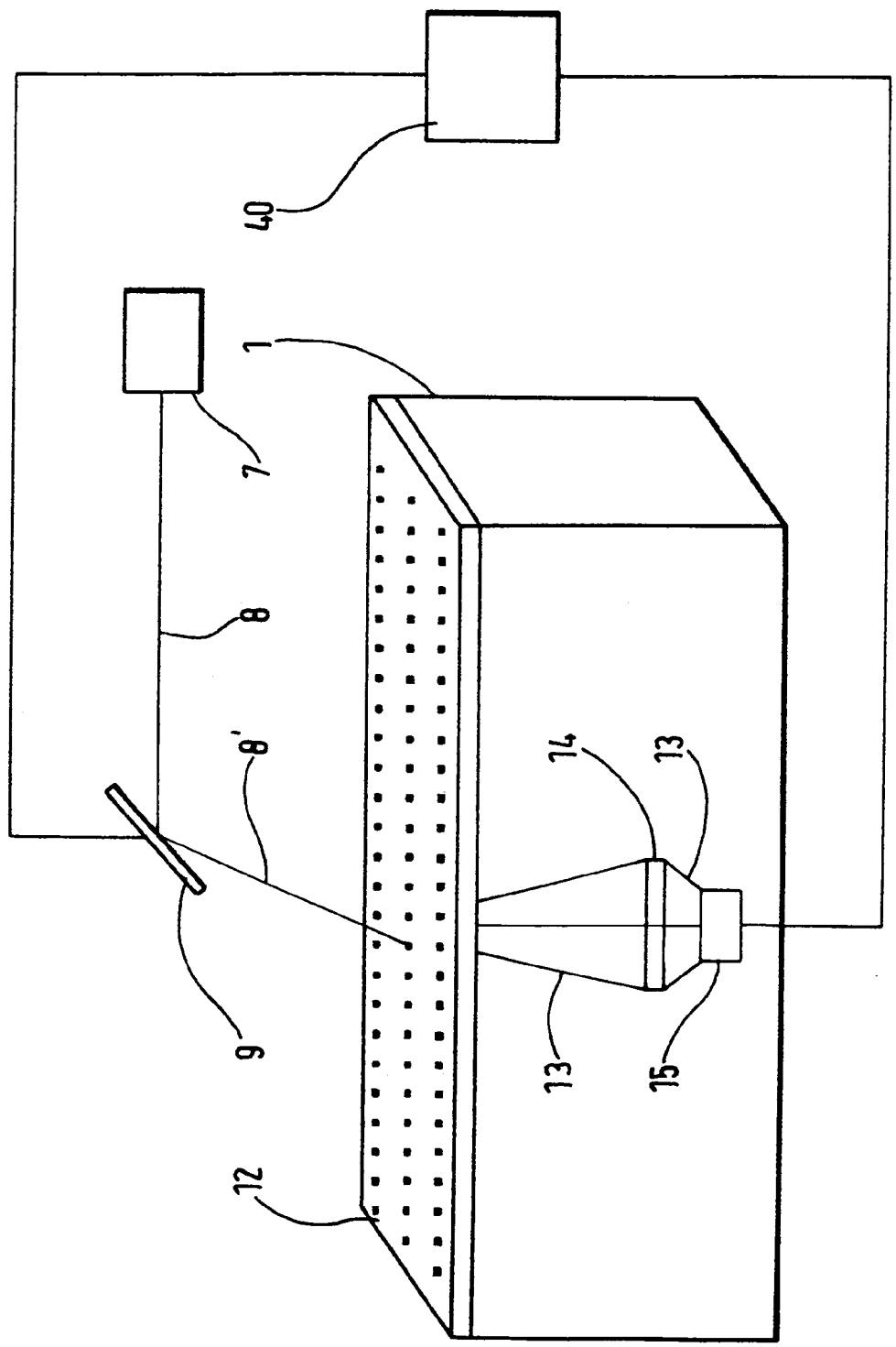
Figure 3:
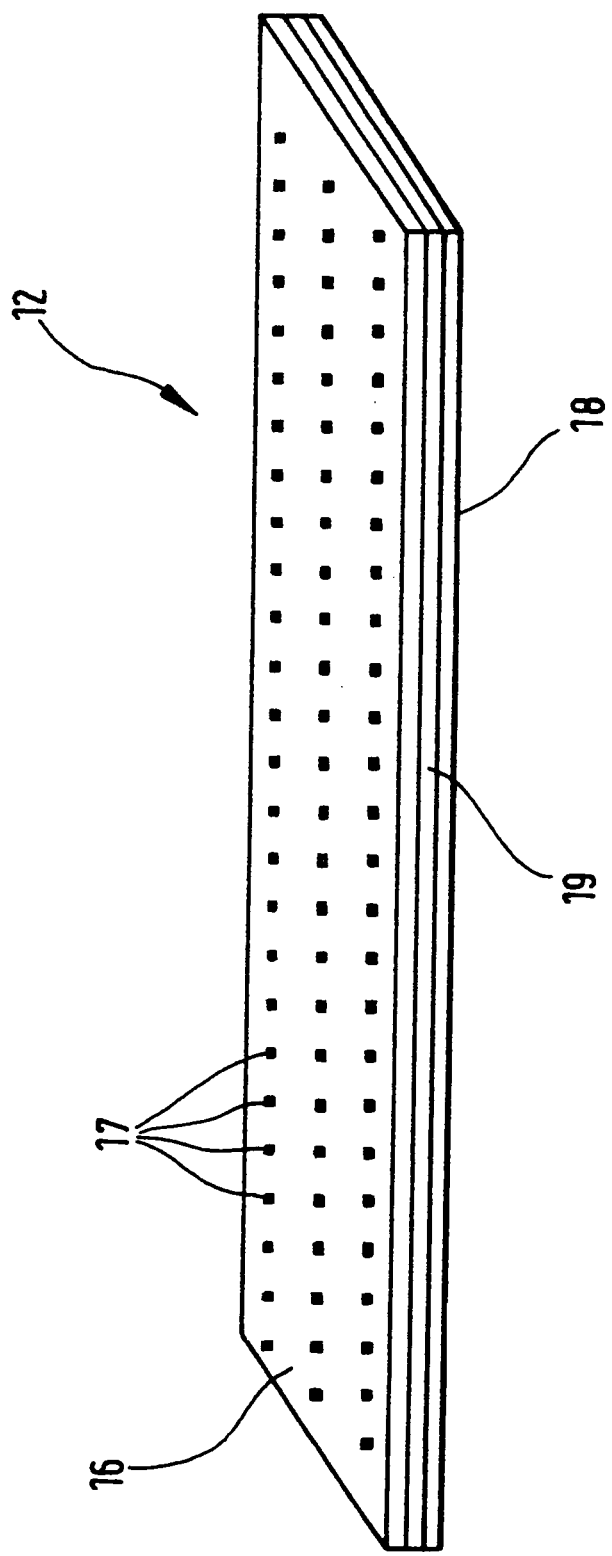

Advantageously, a fully automated calibration is possible over the whole working plane. Furthermore, neither a light-sensitive medium nor a scanner is required, and the whole calibration action is performed within the apparatus. The use of the image converter plate, which converts the laser light into detectable light, is particularly cost-efficient, since an arrangement of several sensors is not required. Further features and aims of the invention can be gathered from the description of embodiments on the basis of the enclosed drawings. In the drawings show:

FIG. 1 a schematic view of a device for manufacturing a three-dimensional object;

FIG. 2 a schematic view of a method and a device for calibrating an irradiation device according to an embodiment of the present invention; and FIG. 3 a schematic view of an image converter plate according to the embodiment of the present invention.

The FIG. 1 shows a schematic view of an apparatus for manufacturing a three-dimensional object 3, which is formed as a laser sintering apparatus in the embodiment.

The laser sintering apparatus comprises a frame 1, which opens to the top and has arranged therein a support 5 being moveable in the vertical direction and supporting the three-dimensional object 3 to be manufactured. The support 5 defines a building surface of the laser sintering apparatus. The frame 1 and the support 5 define therein a building space. If necessary, the frame 1 and the support 5 form an exchangeable replacement frame which can be removed from the laser sintering apparatus. The support 5 is connected to a lift mechanism 4 which moves it in the vertical direction such that, the layer of the object 3, which is presently to be solidified, lies in a working plane 6.

Further, an applicator 10 for applying a layer of a powdery building material 11 is provided. As powdery building material 11, all powders can be used, which can be sintered by a laser, such as synthetic resins which can be sintered by a laser like polyamide, polystyrene and particularly high-temperature synthetic resins like PEEK, metals, ceramics, moulding sands and composite materials. As metalliferous powdery building material 11, any metal and any alloy thereof as well as mixtures with metalliferous components or with non-metalliferous components come into consideration. First, the powdery building material 11 is supplied to the frame 1 from a storage container of the applicator 10. The applicator 10 is then moved to a predetermined height above an upper periphery 2 of the frame 1 in the working plane 6 so that the layer of the powdery building material 11 lies in a defined height above the last solidified layer. The laser sintering apparatus further comprises a radiation source 7 which generates energetic radiation 8'. In this embodiment, the radiation source 7 is a laser 7. The laser 7 generates energetic radiation 8, 8' in the shape of a laser beam 8, 8' which is focused to arbitrary points in the working plane 6 by a deflection device 9. The deflection 9 is realized by a rotatable mirror which is rotatable at least about two axes by an actuator device such as a step motor, in order to scan the whole working plane 6. Thereby, the laser beam 8, 8' can selectively solidify the powdery building material 11 at the desired locations corresponding to the cross-section of the object 3 to be manufactured. The laser 7 and the deflection device 9 form together an irradiation device. As laser, a $CO_2$-laser, a solid state laser such as a Nd:YAG-laser can be used according to the building material to be solidified.

The frame 1, the support 5, the lift mechanism 4 and the applicator 10 are arranged in a process chamber 100. The process chamber 100 has in the upper part an opening for introducing the laser beam 8, 8'. Further, a control unit 40 is provided, by which the laser sintering apparatus is controlled in a coordinated manner to perform the building process and to perform the calibrating method.

During operation of the laser sintering apparatus, the support 5 is moved downwardly in a first step by the lift mechanism 4 until the upper side thereof lies below the working plane 6 by the thickness of one layer. Then, a first layer of the powdery building material 11 is supplied onto the support 5 and smoothened by the applicator 10. Thereafter, the control unit 40 controls the deflection device 9 such that the deflected laser beam 8, 8' selectively impacts at the locations of the layer of the powdery building material 11, which shall be solidified. Thereby, the powdery building material 11 is solidified and/or sintered at these locations, so that the three-dimensional object 3 is generated here.

In a next step, the support 5 is lowered by the lift mechanism 4 by the thickness of the next layer. A second layer of the powdery building material 11 is applied by the applicator 10, smoothened and selectively solidified by the laser beams 8, 8'. These steps are performed several times until the desired object 3 is manufactured.

The FIG. 2 shows a schematic view of a method and a device for calibrating the irradiation device 7, 9 of the laser sintering apparatus according to an embodiment of the present invention; and the FIG. 3 shows a schematic view of an image converter plate 12 according to the embodiment of the present invention.

The device comprises the image converter plate 12 to be arranged in or in parallel to the working plane 6 and which outputs a detectable light 13, when the irradiation device 7, 9 irradiates predetermined positions of the image converter plate 12 with the energetic radiation 8'. The image converter plate 12 preferably consists of a substrate 18 such as a glass substrate 18. At the upper side of the glass substrate 18, an image converting material 19 is applied, for example a thin layer of $SiO_2$. The thin layer $SiO_2$ is able to almost completely convert $CO_2$-laser light 8' into visible light or near-infrared light as detectable light 13. Also Nd:YAG—and fiber lasers can be used as laser 7. The substrate 18 arranged below the image converting material 19 lets the detectable light 13 pass through. The image converter plate 12 is not restricted to this embodiment, since it can also consist of other materials. The image converter plate 12 preferably has at its upper side an aperture mask 16, in which apertures 17 are located corresponding to the predetermined positions of the image converter plate 12. Preferably, the apertures 17 are distributed over the whole image converter plate 12 so that the irradiation device 7, 9 can be calibrated over the whole working plane 6. In the embodiment, the aperture mask 16 is embodied as a plate such as a steel plate, into which the apertures 17 are bored. The aperture mask 16 in the shape of the plate also offers a mechanical reinforcement for the glass substrate 18. Preferably, the apertures 17 are aligned in the impact direction of the energetic radiation 8'. The thicknesses of the aperture mask 16, the glass substrate 18 and the image converting material 19 as shown in FIG. 3 are not true to scale, but only schematically depicted.

The device also has a light detector 15 which detects the detectable light 13 output from the image converter plate 12. Since in this case, the detectable light 13 is visible light, the light detector 15 can be embodied as CCD-chip. Between the image converter plate 12 and the light detector 15, a focusing optics 14 is arranged, which focuses the detectable light 13 toward the light detector 15. Preferably, the image converter plate 12, the light detector 15 and the focusing optics 14 are formed as one unit, for example by providing a frame or a case in which the image converter plate 12, the light detector 15 and the focusing optic 14 are mounted as one unit.

The light detector 15 is connected to an evaluation unit 40 which is integrated in the control unit 40 in the present embodiment. The evaluation unit 40 is also connected to the deflection device 9 and receives angle coordinates of the actuator motors for the mirror of the deflection device 9, which indicate an actual posture and/or orientation of the mirror.

The operation of the device is as follows:

In the first step, the light detector 15 and the focusing optics 14 are arranged into the building space of the apparatus below the working plane 6. For example, the light detector 15 and the focusing optics 14 can be arranged onto support 5 which has previously been moved to a desired height. Thereafter, the image converter plate 12 is set in or in parallel to the working plane 6 into the apparatus. The exact position and the height of the image converter plate 12 in the apparatus can be adjusted by not-shown positioning devices such as positioning pins or jigs. If the image converter plate 12, the light detector 15 and the focusing optics 14 are formed as one unit, the arrangement of these elements 12, 14, 15 is performed in one step. Preferably, the image converter plate 12 is heated for example by a heating device of the apparatus, so that it may have a temperature of about 150° C., for example, where a better effect of the image conversion can be expected.

In the next step, the image converter plate 12 is scanned by the irradiation device 7, 9. As soon as the laser beam 8' passes over an aperture 17 in the aperture mask 16, the laser beam 8' falls onto the $SiO_2$-layer applied at the upper side of the glass substrate 18 and is converted into visible light 13. The visible light 13 passes through the glass substrate 18 and thereafter through the focusing optics 14 and is focused to the light detector 15.

The light detector 15 detects the detectable light 13 and outputs to the evaluation device 40 a corresponding intensity signal of the detected, detectable light 13.

While the laser beam 8' passes over an aperture 17 located in the aperture mask 16, the evaluation device 40 recognizes an increasing flank and a dropping flank of the intensity signal of the detected, detectable light 13. On the basis of the increasing flank and the dropping flank, the evaluation device 40 can derive the exact time at which the laser beam 8' passes the center of the aperture 17, and the actual coordinates by which the deflection device 9 is controlled at this time. The evaluation device 40 receives the actual coordinates of the mirror of the deflection device 9 from the irradiation device 7, 9, and evaluates therefrom those actual coordinates at which the laser beam 8' has passed the exact center of the aperture 17.

In the evaluation device 40, there are also stored reference coordinates corresponding to the center of the respective apertures 17, for example. The reference coordinates are known, since the image converter plate 12 is arranged in a fixedly defined position in the apparatus and the position of the apertures 17 within the image converter plate 12 is also known.

In the next step, the evaluation device 40 compares the determined actual coordinates with the predetermined reference coordinates. On the basis of the deviation between the determined actual coordinates and the reference coordinates, the evaluation device 40 calibrates the irradiation device 7, 9 for example in a manner, which is well known in the prior art. For example, the actuator variables of the step motors for the mirror of the deflection device 9 are corrected on the basis of a correction table. The accuracy of the calibration is so much higher as smaller the diameter of the apertures 17 and as smaller the thickness of the image converter plate 12 are.

The calibration of the irradiation device 7, 9 is performed fully automated by scanning the whole image converter plate 12 by the laser beam 8' in a self-acting manner, while the evaluation device 40 thereafter performs the calibration.

The scope is not only restricted to the present embodiments, but encompasses further alterations and modifications, provided that these will fall within the scope as defined by the enclosed claims.

The irradiation device 7, 9 must not necessarily scan the whole image converter plate 12, because it can be sufficient that the image converter plate 12 is only partially scanned.

While in the present embodiment, the image converter plate 12 comprises an aperture mask 16, a modification of the image converter plate 12 may comprise a radiation permeable glass substrate 18, on which an image converting material 19 is applied only at the predetermined positions of the image converter plate 12. In this case, the aperture mask 16 can be omitted.

While the aperture mask 16 in the present embodiment is formed as a steel sheet, the aperture mask 16 can also be applied onto the glass substrate 18 by a coating method.

The light detector 15 of the present embodiment is a CCD-chip, whereas also a photodiode, a video camera or detectors on the basis of Ge or Si can be used instead. While in the present embodiment, only one light detector 15 is used, several light detectors 15 can be used in a modification.

While the evaluation device in the present embodiment is integrated in the control unit 40, the evaluation device can be provided separately from the control unit 40 or also separately from the apparatus as such.

The calibration of the irradiation device can be performed in the laser sintering device or separately outside thereof.

The method according to the invention is not only applicable to laser sintering, but to all generative methods, in which a powdery or liquid material is used, which is solidified with energetic radiation. The energetic radiation must not necessarily be a laser beam 8', but it can also be an electron beam, for example.

The invention claimed is:

1. A method of calibrating a $CO_2$ laser of an apparatus for generatively manufacturing a three-dimensional object, wherein the apparatus layerwise applies a powdery or liquid building material onto a support of the apparatus or a previously applied layer, the applied layer defining a working plane, and irradiates the building material by the $CO_2$ laser with energetic radiation at locations corresponding to the object so as to solidify the building material at these locations, the method comprising the following steps:
arranging an image converter plate in, or in parallel to, the working plane, wherein the image converter plate outputs detectable light when the $CO_2$ laser irradiates predetermined positions of the image converter plate with the energetic radiation, wherein the image converter plate can convert $CO_2$ laser light into visible light to near-infrared light and the image converter plate consists of (i) a substrate which permits detectable light to pass through, (ii) an aperture mask in which apertures are located corresponding to the predetermined positions of the image converter plate, and (iii) an image converter material, and the aperture mask is arranged at an upper side of the image converter plate and the image converting material is arranged between the substrate and the aperture mask;
scanning the image converter plate by the $CO_2$ laser;
detecting the detectable light by a light detector;
determining coordinates of the $CO_2$ laser when the detectable light is detected;
comparing the determined coordinates with predetermined reference coordinates; and
calibrating the $CO_2$ laser on the basis of a deviation between the determined coordinates and the reference coordinates.

2. The method according to claim 1, further comprising applying an image converting material only at the predetermined positions on the image converter plate.

3. The method according to any one of claim 1, further comprising arranging the light detector below the image converter plate.

4. The method according to claim 1, wherein the light detector is selected from a CCD-chip, a photodiode or a video camera.

5. The method according to claim 1, further comprising arranging a focusing optics, which focuses the detectable light onto the light detector, between the image converter plate and the light detector.

6. The method according to claim 1, wherein the $CO_2$ laser comprises a radiation source and a deflection device, which deflects the energetic radiation emitted from the radiation source to arbitrary positions in the working plane, and further comprising calibrating the deflection device on the basis of the deviation between the determined coordinates and the reference coordinates.

7. A device for performing the method according to claim 1, the device comprising:
the image converter plate, which is to be arranged in or in parallel to the working plane and outputs detectable light, when the $CO_2$ laser irradiates predetermined positions of the image converter plate with energetic radiation, wherein the image converter plate can convert $CO_2$ laser light into visible light to near-infrared light and the image converter plate consists of (i) a substrate which permits detectable light to pass through, (ii) an aperture mask in which apertures are located corresponding to the predetermined positions of the image converter plate, and (iii) an image converter material, and the aperture mask is arranged at an upper side of the image converter plate and the image converting material is arranged between the substrate and the aperture mask;
the light detector, which detects the detectable light output from the image converter plate; and
an evaluation device, which determines the coordinates of the $CO_2$ laser, when the detectable light is detected, compares the determined coordinates with predetermined reference coordinates, and calibrates the $CO_2$ laser on the basis of the deviation between the determined coordinates and the reference coordinates.

8. The method according to claim 1, further comprising applying an image converting material only at the predetermined positions on the image converter plate.

9. Method according to claim 1, further comprising arranging the light detector below the image converter plate.

10. The method according to claim 1, wherein the light detector is selected from a CCD-chip, a photodiode or a video camera.

11. The method according to claim 1, further comprising arranging a focusing optics, which focuses the detectable light onto the light detector, between the image converter plate and the light detector.

12. The method according to claim 1, wherein the $CO_2$ laser comprises a radiation source and a deflection device, which deflects the energetic radiation emitted from the radiation source to arbitrary positions in the working plane, and further comprising calibrating the deflection device on the basis of the deviation between the determined coordinates and the reference coordinates.

13. A device for performing the method according to claim 1, the device comprising:
the image converter plate, which is to be arranged in or in parallel to the working plane and outputs detectable light, when the $CO_2$ laser irradiates predetermined positions of the image converter plate with energetic radiation, wherein the image converter plate can convert $CO_2$ laser light into visible light to near-infrared light and the image converter plate consists of (i) a substrate which permits detectable light to pass through, (ii) an aperture mask in which apertures are located corresponding to the predetermined positions of the image converter plate, and (iii) an image converter material, and the aperture mask is arranged at an upper side of the image converter plate and the image converting material is arranged between the substrate and the aperture mask;
the light detector, which detects the detectable light output from the image converter plate; and
an evaluation device, which determines the coordinates of the $CO_2$ laser, when the detectable light is detected, compares the determined coordinates with predetermined reference coordinates, and calibrates the $CO_2$ laser on the basis of the deviation between the determined coordinates and the reference coordinates.

14. The method according to claim 1, further comprising aligning the apertures in the impact direction of the energetic radiation.

15. The method according to claim 14, further comprising applying an image converting material only at the predetermined positions on the image converter plate.

16. Method according to claim 14, further comprising arranging the light detector below the image converter plate.

17. The method according to claim 14, wherein the light detector is selected from a CCD-chip, a photodiode or a video camera.

18. The method according to claim 14, further comprising arranging a focusing optics, which focuses the detectable light onto the light detector, between the image converter plate and the light detector.

19. The method according to claim 14, wherein the $CO_2$ laser comprises a radiation source and a deflection device, which deflects the energetic radiation emitted from the radiation source to arbitrary positions in the working plane, and
further comprising calibrating the deflection device on the basis of the deviation between the determined coordinates and the reference coordinates.

20. A device for performing the method according to claim 14, the device comprising:
the image converter plate, which is to be arranged in or in parallel to the working plane and outputs detectable light, when the $CO_2$ laser irradiates predetermined positions of the image converter plate with energetic radiation, wherein the image converter plate can convert $CO_2$ laser light into visible light to near-infrared light and the image converter plate consists of (i) a substrate which permits detectable light to pass through, (ii) an aperture mask in which apertures are located corresponding to the predetermined positions of the image converter plate, and (iii) an image converter material, and the aperture mask is arranged at an upper side of the image converter plate and the image converting material is arranged between the substrate and the aperture mask;
the light detector, which detects the detectable light output from the image converter plate; and
an evaluation device, which determines the coordinates of the $CO_2$ laser, when the detectable light is detected, compares the determined coordinates with predetermined reference coordinates, and calibrates the $CO_2$ laser on the basis of the deviation between the determined coordinates and the reference coordinates.

21. A device for performing a method of calibrating a $CO_2$ laser of an apparatus for generatively manufacturing a three-dimensional object, wherein the apparatus layerwise applies a powdery or liquid building material onto a support of the apparatus or a previously applied layer, the applied layer defining a working plane, and irradiates the building material by the $CO_2$ laser with energetic radiation at locations corresponding to the object so as to solidify the building material at these locations, the device comprising:
an image converter plate, which is to be arranged in or in parallel to the working plane and outputs detectable light, when the $CO_2$ laser irradiates predetermined positions of the image converter plate with energetic radiation, wherein the image converter plate can convert $CO_2$ laser light into visible light to near-infrared light and the image converter plate consists of (i) a substrate which permits detectable light to pass through, (ii) an aperture mask in which apertures are located corresponding to the predetermined positions of the image converter plate, and (iii) an image converter material, and the aperture mask is arranged at an upper side of the image converter plate and the image converting material is arranged between the substrate and the aperture mask;
a light detector, which detects the detectable light output from the image converter plate; and
an evaluation device, which determines the coordinates of the $CO_2$ laser, when the detectable light is detected, compares the determined coordinates with predetermined reference coordinates, and calibrates the $CO_2$ laser on the basis of the deviation between the determined coordinates and the reference coordinates.

22. The device according to claim 21, wherein the image converter plate comprises a substrate, on which an image converting material is applied only at the predetermined positions of the image converter plate, wherein the substrate permits detectable light to pass through.

23. The device according to claim 21, wherein the light detector is arranged below the image converter plate.

24. The device according to claim 21, wherein the light detector is selected from a CCD-chip, a photodiode or a video camera.

25. The device according to claim 21, Further comprising a focusing optics, which focuses the detectable light to the light detector, and is arranged between the image converter plate and the light detector.

26. The device according to claim 21, wherein the $CO_2$ laser comprises a radiation source and a deflection device, which deflects the energetic radiation emitted from the radiation source to arbitrary positions in the working plane, wherein the deflection device is calibrated on the basis of the deviation between the determined coordinates and the reference coordinates.

* * * * *